United States Patent

[11] 3,622,849

[72] Inventors Fred W. Kelley, Jr.
 Media;
 Floyd L. Steen, Lansdowne, both of Pa.
[21] Appl. No. 49,092
[22] Filed June 23, 1970
[45] Patented Nov. 23, 1971
[73] Assignee General Electric Company

[54] THYRISTOR JUNCTION TEMPERATURE MONITOR
 10 Claims, 7 Drawing Figs.
[52] U.S. Cl. .................................................. 317/33 SC,
 73/342, 73/362 SC, 307/202, 317/41, 323/16,
 323/69
[51] Int. Cl. ...................................................... H02h 5/04,
 H02h 7/14
[50] Field of Search ........................................... 73/342, 362
 SC; 307/202; 317/33 SC, 41; 323/16, 19, 68, 69

[56] References Cited
 UNITED STATES PATENTS
 3,371,231 2/1968 Burley .......................... 323/68 UX
 3,502,944 3/1970 Squiers ......................... 317/41 X
 3,564,293 2/1971 Mungenast ................... 317/41 X Primary Examiner—A. D. Pellinen
Attorneys—J. Wesley Haubner, Barry A. Stein, Frank L. Neuhauser, Oscar B. Waddell and Joseph B. Forman ABSTRACT: A circuit for monitoring the junction temperature of a conducting thyristor by measuring the temperature of a reference point and synthesizing the thermal response of the physical configuration between the thyristor junction and that reference point. The synthesized signal generated is indicative of the temperature difference between the junction and said reference point. That signal is combined with a signal indicative of the measured reference temperature to provide an output signal indicative of junction temperature per se. The output signal may be utilized to stop conduction in the thyristor when the monitored temperature exceeds a predetermined level.

INVENTORS:
FRED W. KELLEY, JR.,
FLOYD L. STEEN,
BY Barry A. Stein
ATTORNEY

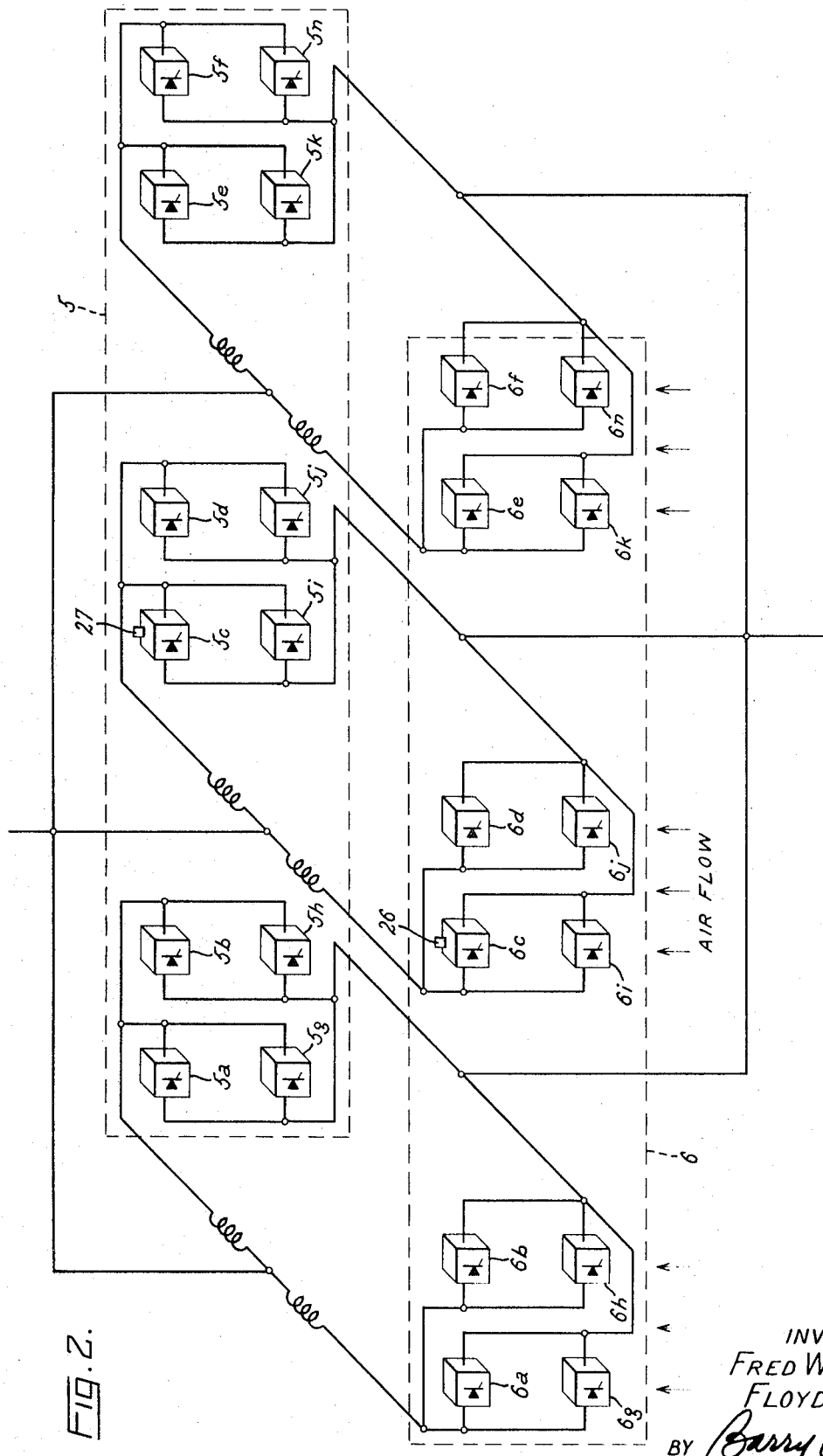

INVENTORS:
FRED W. KELLEY, JR.
FLOYD L. STEEN,
BY Barry C. Stein
ATTORNEY

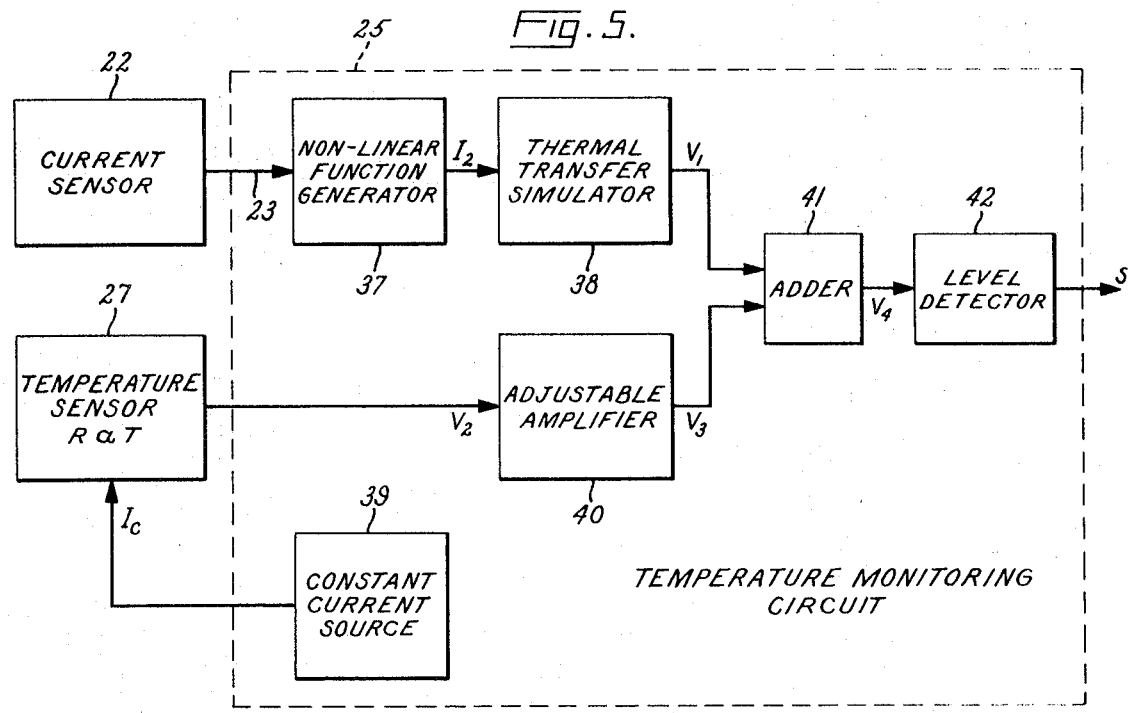
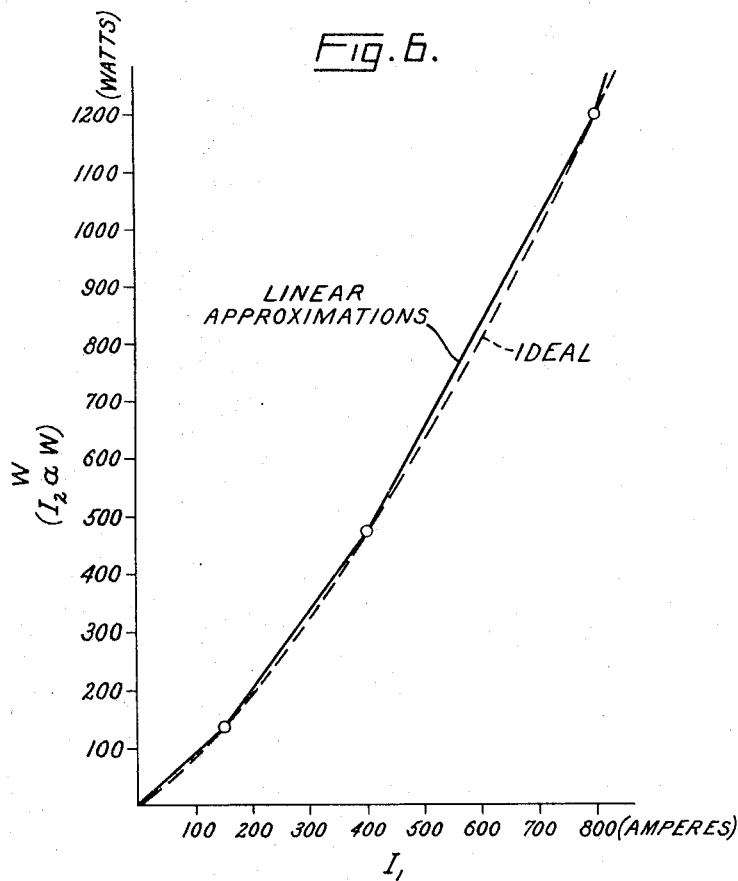

3,622,849

THYRISTOR JUNCTION TEMPERATURE MONITOR

BACKGROUND AND OBJECTS OF THE INVENTION

This invention relates generally to temperature monitoring circuits and more particularly to a circuit for monitoring the junction temperature of a semiconductor device and for providing a signal if this temperature rises to a preselected level.

Solid state devices such as thyristors are commonly utilized today in electric power converters, frequency changers and static switches. Thyristors are multilayer semiconductor devices having a plurality of PN-junctions through which load current will pass when the thyristor is turned on while being forward biased. For more information about such devices see *Semiconductor Controlled Rectifiers* by F. E. Gentry et al. (published in 1964 by Prentice-Hall Inc. Englewood Cliffs, New Jersey).

As is well-known, the passage of current through a PN-junction results in a certain amount of power loss and heat generation therein, whereby the junction temperature will be elevated above ambient. In high-power applications this phenomenon becomes significantly more acute owing to the high-voltage and current to which the solid state devices are subjected. Heat sinks are commonly provided in order to dissipate a portion of the generated heat. Nevertheless, continuous operation or frequent activation with minimal off periods may result in elevating the junction temperature to dangerous levels, particularly if the ambient temperature is high.

With excessively high temperatures, the current conducting and blocking voltage capabilities of semiconductors decrease well below their maximum ratings, thereby reducing their operational capabilities. These reduced capabilities may result in the failure of the semiconductor to perform its assigned circuit function (e.g., in the case of a thyristor to block current until triggered while forward biased) and may sometimes involve the destruction of the semiconductor device itself.

In order to preclude any damage to the device itself or to its associated circuitry it should be turned off before its junction temperature reaches a dangerously high level. Heretofore this has been done by connecting in series with the semiconductor device a thermal overload responsive device such as a fuse. This involves not only the expense of the protective device but also the problem of matching its thermal characteristics to the semiconductor device to be protected. Better thermal protection might be achieved if it were possible to quickly and accurately determine that a critical level of junction temperature is being closely approached.

Accordingly, it is an object of our invention to provide a circuit for quickly and accurately monitoring the junction temperature of an operational semiconductor device.

Junction temperature determination can be achieved either from within the semiconductor device or from without it. In order to physically monitor junction temperature from within, a temperature sensor would be placed inside the device adjacent to its junction. Such an approach is presently expensive and impractical because the junction itself is not normally accessible, and it would require special fabrication of semiconductor devices particularly adapted to accommodate a temperature sensor therein.

If, on the other hand, junction temperature is measured from without the device, flexibility is provided since the need for specially constructed semiconductor devices is obviated. However, junction temperature determination from without the device cannot be accomplished with a satisfactory degree of accuracy by merely monitoring the semiconductor devices's housing temperature. Owing to the slow thermal transfer characteristics of the housing structure and its associated hardware, an external measurement of temperature may not accurately reflect the junction temperature existing at the instant of measurement.

Another object of our invention is the provision for monitoring the junction temperature of a semiconductor device by an improved circuit that provides the accuracy of an internal measurement and the convenience of an external measurement.

A further object of our invention to provide a circuit for monitoring the junction temperature of a semiconductor device from without the device by synthesis utilizing certain physically measured parameters.

A further object of this invention to provide a circuit for monitoring the junction temperature of a thyristor included in a static switch circuit whereupon said circuit will be opened and load current safety interrupted if the junction temperature rises to a preselected level.

SUMMARY OF THE INVENTION

A temperature monitor is provided for determining if the junction temperature of a conducting thyristor has reached a preselected level corresponding to an dangerously elevated junction temperature. The monitor comprises circuitry which synthesizes the thermal response of a portion of the thyristor and the associated pressure assembly between the interior PN-junction of the thyristor and an external reference point on the heat sink closely adjacent the junction. The synthesizing circuitry utilizes a measured signal indicative of the current level flowing through the junction and converts this signal to a signal indicative of the power dissipated in the junction. The latter signal is supplied to a thermal transfer simulator where it is converted into a signal indicative of the temperature difference between the junction and the heat sink reference point. This signal is combined in an adder circuit with a measured signal indicative of the heat sink temperature to provide an output signal indicative of the junction temperature per se. The output of the adder circuit is preferably supplied to a level detector for providing a stop signal when its input is above a preselected level. Means responsive to the stop signal may then be used to suppress the gate signals to the conducting thyristor so that it turns off and cools down.

BRIEF DESCRIPTION OF DRAWINGS

FIG. 2 is an orthographic schematic diagram of a portion of the static switch shown in FIG. 1.

FIG. 5 is a functional block diagram of a portion of the circuit shown in FIG. 1.

FIG. 6 is a graph of the power dissipation characteristics of a thyristor.

DETAILED DESCRIPTION OF THE PREFERRED EMBODIMENT OF OUR INVENTION

Figure 1:
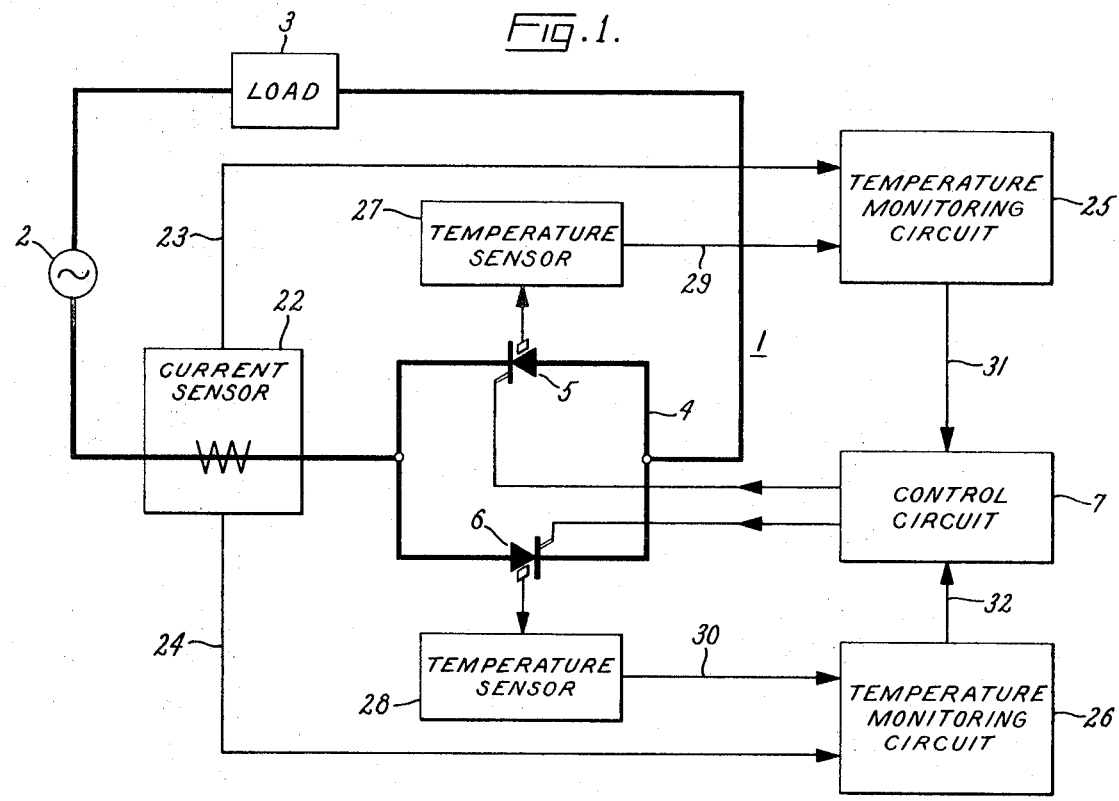
FIG. 1 is a functional block diagram of our junction temperature monitor provided for a static switch.

FIG. 1 shows, in block diagram form, one phase of a solid state (static), three-phase, alternating current, circuit breaker equipped with our invention.

One phase of circuit breaker 1, which is connected between a source of alternating voltage 2 and a load 3, comprises a switch 4 consisting of inverse parallel connected thyristor legs 5 and 6 and a control circuit 7 therefor. The control circuit provides trigger signals to the gate electrodes of the thyristors making up the switch in order to render them conductive thereby providing the load with alternating current.

As is well-known in the art a thyristor will conduct load current when triggered at a time during which its anode is biased positively with respect to its cathode. Therefore in an AC switch thyristors are commonly connected in inverse parallel relationship so as to enable load current to flow during both the positive and negative half cycles of source voltage. Once triggered a thyristor will continue to conduct until the current level through it drops below a certain holding level. When connected in an AC system load current conduction will cease at a cyclically occurring natural current zero, and the thyristor will remain off until it is retriggered at a time when its anode voltage is again positive.

Circuit breaker 1 includes means (not shown) to detect the occurrence of a fault and to suppress the gate signals to the thyristors in response thereto, whereby load current will be interrupted at the next occurring current zero. Commutation means (not shown) may also be provided to force the conducting thyristors off before the next current zero, thereby limiting the fault current in its incipiency.

In FIG. 1 thyristor legs 5, 6 are shown symbolically as having a double gate electrode in order to indicate that each leg actually comprises a plurality of individual thyristors connected in parallel for large current handling capabilities. This construction is shown in greater detail in FIG. 2.

FIG. 2 is an orthographic schematic diagram of one phase module of a three phase circuit breaker. This figure depicts in simplified form the physical arrangement and electrical connection of the plural thyristors which compose switch 4. Each block shown in FIG. 2 represents an individual thyristor and its associated pressure assembly. Blocks 5a through 5n are connected in parallel to make up thyristor leg 5 and blocks 6a through 6n are connected in parallel to make up thyristor leg 6.

The individual thyristors and their associated pressure assemblies are, in practice, mounted in close proximity to one another in a unitary structure which includes means for providing a flow of cooling air in the direction shown across heat dissipating means in the individual pressure assemblies.

Figure 3:
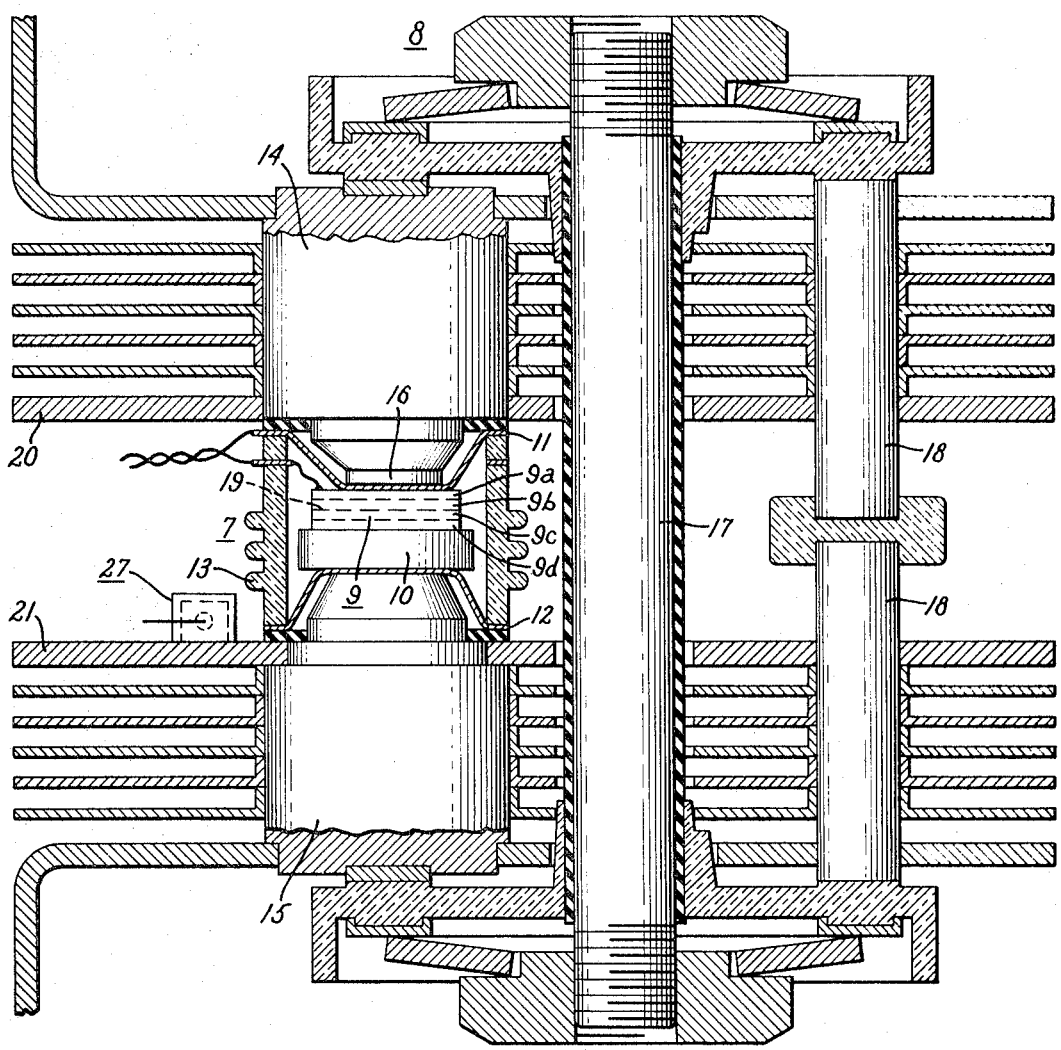
FIG. 3 is a cross sectional view of a thyristor and its associated pressure assembly.

A typical thyristor 7 and its associated pressure assembly 8 is shown in cross section in FIG. 3. This figure is a simplification of the unit shown in FIG. 1 of U.S. Pat. No. 3,471,757 and assigned to the assignee of the instant application, and it also shows a portion of our monitor attached thereto.

Thyristor 7 comprises a thin disclike wafer or body 9 disposed on a thicker substrate 10 of tungsten or the like. The wafer is characterized by four layers 9a, 9b, 9c and 9d of silicon of alternately P- and N-type conductivity (the interface of contiguous layers creating a rectifying junction). The disclike semiconductor wafer 7 and its substrate 10 are sandwiched between a pair of cup shaped terminal members 11 and 12 whose rims are bonded to opposite ends of a ceramic sleeve 13 to form an integral hermetically sealed housing for the wafer. The sidewalls of the cup shaped terminal members are made of ductile conductive metal, such as copper, and the bottoms of these members serve as the main electrodes of the thyristor. Terminal member 12 forms the thyristor anode and terminal 11 forms its cathode. Thyristor 7 is disposed physically between and connected electrically in series with a pair of aligned copper thrust members or posts 14 and 15 that serve as combined electrical and thermal conductors. A conductive strain buffer 16 is interposed between the cathode 11 and the post 14. The anode and cathode of the thyristor 7 and the respective posts 14 and 15 are mechanically coupled by pressing them together under high pressure. To this end the clamping assembly 8 comprises a central tie bolt 17 in tension which provides an axial compressive force on each of the posts 14 and 15. Additional sets of posts are also provided (only one of which, 18, is shown). A complete explanation of the clamping assembly can be found in the above mentioned patent.

During thyristor operation, the passage of electrical current through its rectifying junctions generates heat therein. Owing to its relatively higher voltage drop, midjunction 19 tends to generate the most heat of all of the thyristor rectifying junctions. Conductive posts 14 and 15 serve as thermal heat sinks for thyristor 7. In order to promote the dissipation of heat from these posts they are equipped, respectively, with two groups of spaced metal cooling fins 20 and 21 to form a unitary heat dissipating assembly.

Although the heat sink is normally effective to dissipate sufficient junction-generated heat to keep the device within safe thermal operating limits, nevertheless, certain conditions may occur which elevate junction temperature to impermissible levels. Consequently, it is desirable to determine the existing junction temperature in order to turn off the device and allow it to cool down if its junction temperature approaches those levels.

Direct measurement of junction temperature is presently impractical owing to the inaccessibility of the junction. Heat sink temperature can be conveniently measured but it does not reflect junction temperature as precisely as may be desired in certain practical applications of high-power thyristors. Junction temperature is a function of the power dissipated in the semiconductor wafer, the rate at which heat is diffused away from the junction and the temperature conditions of the semiconductor device, its housing, its associated pressure assembly and the surrounding atmosphere. A measurement of heat sink temperature per se will not accommodate all of these factors.

Our temperature monitoring circuit measures the temperature of a readily accessible reference point while synthesizing the thermal condition of the thyristor and a portion of its associated pressure assembly. The synthesized signal generated is indicative of the temperature difference between the junction and the reference point (e.g., a point on the heat sink). This signal is then combined with the reference signal to provide a signal indicative of junction temperature per se.

The synthesized signal takes into account the power dissipated in the junction, the rate of heat diffusion and the temperature conditions of the device, thereby insuring accuracy of measurement. The rate at which the generated heat diffuses from the junction is a function of the transient thermal impedance of the device. Transient thermal impedance is the ratio of the temperature rise of the junction as a function of time, to the power dissipated in this junction. Therefore, if the power dissipated in the junction at a particular instant is known, the temperature rise of the junction can be determined if the transient thermal impedance is also known.

A direct analogy exists between the equivalent thermal circuit of a thyristor and an RC filter network. For a more detailed discussion of this subject see pages 166 through 187 of the aforementioned book by Gentry et al. Proper selection of component values of the RC network will provide an electrical circuit having a response analogous to the transient thermal impedance of the physical configuration used (e.g., the configuration between the junction and a reference point on the heat sink). The synthesized RC network may then be provided with a signal indicative of the amount of power dissipated in the junction to render an output indicative of the temperature difference between the junction and the reference point.

Transient thermal impedance of a device is a function of several factors, among which are: (1) the size of the heat sink to which it is attached; (2) the velocity of the cooling fluid which flows across the heat sink and (3) the surface conditions of the heat sink (e.g., degree of cleanliness).

In order to minimize any discrepancies caused by changes in ambient atmosphere temperature or velocity or surface condition of the heat sink, we preferably synthesize the RC network to correspond to the thermal characteristics of the configuration between the junction and a reference point on the heat sink closest to the junction.

As shown in FIG. 1 our junction temperature monitor comprises a number of duplicate components. This construction is preferable when used in conjunction with bidirectional switch 4 in order to be able to detect overheating in either of the alternately conducting thyristor legs 5 and 6. For example, temperature sensing means 27, temperature monitoring circuit 25 and current sensor 22 serve to monitor the temperature level of schematically shown thyristor leg 5, while temperature sensor 28 (a duplicate of sensor 27), temperature monitoring circuit 26 (a duplicate of circuit 25), and common current sensor 27 serve to monitor the leg 6.

As can be seen in FIG. 1, outputs 23 and 24 of current sensor 22 are supplied to the respective monitoring circuits 25 and 26 as are the outputs 29 and 30 of respective temperature sensors 27 and 28. The temperature monitoring circuits' respective outputs 31 and 32 are supplied to control circuit 7. Should a thyristor's junction temperature become dangerously elevated, the temperature monitoring circuit associated therewith will provide a stop signal to the control circuit 5. Upon receipt of this signal, control circuit 5 will cease providing gate signals to the switch thyristors which thereupon cease conducting at the occurrence of the next natural current zero. The thyristors can then be allowed to cool down sufficiently before being again rendered conductive by the resumption of gate signals from control 7.

As was previously noted, the thyristor legs 5 and 6 physically comprise parallel arrays of many individual thyristors. The manner of their connection in one phase module is shown in FIG. 2. Those thyristors (5c, 5d, 5i, 5j, 6c, 6d, 6i and 6j) which are disposed near the middle of each array will normally heat up more than the others. Further, owing to the fact that the cooling air for the phase module flows in the direction shown, the downstream central thyristors, namely, 5c, 5d, 6c and 6d, will normally heat up more than upstream thyristors 5i, 5j, 6i and 6j. By providing temperature sensors adjacent only those thyristors which would be expected to get the hottest, worse case conditions are provided for while the necessity of sensor duplication is minimized. To that end thyristor 5c is provided with temperature sensor 27 and thyristor 6c is provided with temperature sensor 26.

Figure 4:
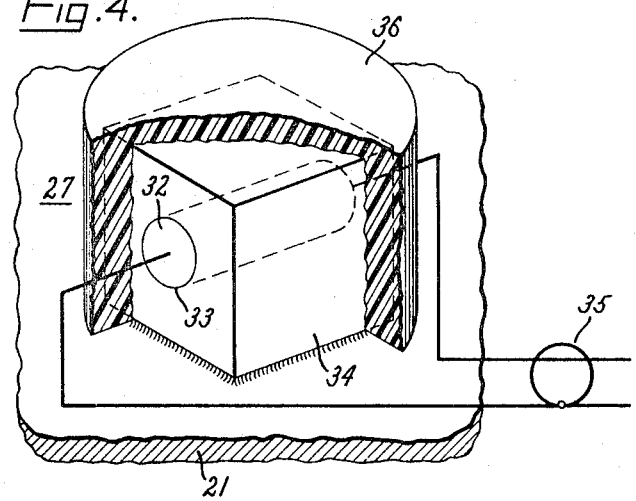
FIG. 4 is a perspective view partially in section of a portion of the junction temperature sensor used in our monitor.

The construction of temperature sensor 27 and its disposition on a heat sink fin of thyristor 5c's pressure assembly is shown in FIGS. 4 and 3, respectively. As can be seen therein the temperature sensor comprises a thermistor 32 which is disposed inside an aperture 33 in a thermally conductive member such as copper block 34. The terminal wires of the thermistor exit the block at opposing sidefaces thereof and are connected to a coaxial cable 35 which serves to connect the thermistor to the temperature monitoring circuit. Block 34 is connected to a heat sink fin 21 immediately adjacent the thyristor for the reasons previously considered. The block and its associated thermistor are protected by a mass 36 of potting material encapsulating them therein.

FIG. 5 is a detailed block diagram of the components which provide the junction temperature monitoring function for thyristor 5c.

Current sensor 22 preferably comprises a current transformer having two identical outputs. Output 23 is provided from temperature monitoring circuit 25 (shown in FIG. 5) while output 24 is provided for monitoring circuit 26. Output 23 is a signal, hereinafter denoted as $I_1$, whose magnitude is indicative of the magnitude of current flowing through the rectifying junction 19. This signal is provided as an input to a nonlinear function generator 37. Nonlinear function generator 37 translates signal $I_1$ into a signal which is indicative of the amount of power being dissipated in the junction. To accomplish that end generator 37 is constructed to simulate the power dissipation characteristics of the junction.

FIG. 6 is a graph showing the actual (ideal) power dissipation response of thyristor 7 and linear approximations thereto. The ideal curve is the nonlinear power dissipation response of rectifying junction 19 for different magnitudes of junction current. Linear approximations of the ideal, such as that depicted by the solid lines, can be made in order to practically synthesize a circuit having a transfer function substantially equivalent to the ideal. Nonlinear function generator 37 comprises suitable circuitry for making such approximations, whereby the magnitude of its output signal $I_2$ is substantially proportional to the amount of power being dissipated in the junction for any value of $I_1$.

Signal $I_2$ is fed as an input into the thermal transfer simulator 38 whose function is to convert signal $I_2$, which is indicative of junction power dissipation, to a signal indicative of the difference in temperature between the junction and a selected reference point.

Figure 7:
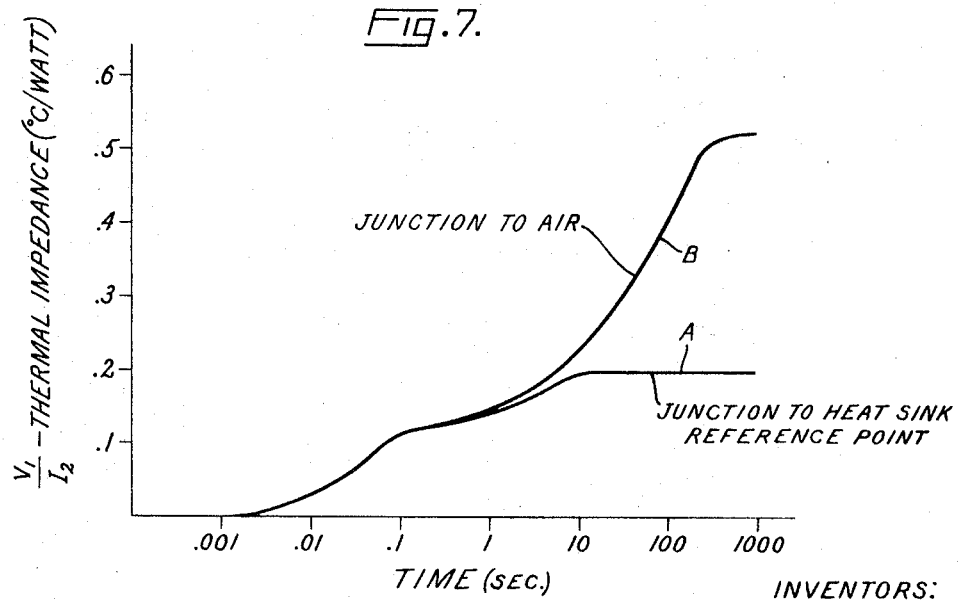
FIG. 7 is a graph of the transient thermal impedance of the thyristor and its associated pressure assembly.

As was previously noted, if the amount of power dissipated by the junction is known and the transient thermal impedance of the configuration of the thyristor and a portion of its associated pressure assembly is also known, the temperature difference between the junction and that portion of the pressure assembly can be determined. To that end we provide a thermal transfer simulator circuit whose transfer function is synthesized to substantially correspond to the transient thermal impedance of the portion of the thyristor and its associated pressure assembly between junction 19 and the point on heat sink 21 where temperature sensor 27 is attached. The simulator essentially comprises an RC frequency attenuating network or filter whose values of the resistance and capacitance are selected to provide the desired transfer function. FIG. 7 curve A shows the transfer function of the thermal transfer simulator constructed in accordance with that design objective. Curve B depicts the transient thermal impedance of the thyristor and the entire associated pressure assembly (i.e., junction to air).

By supplying simulator 38 with an input indicative of the power being dissipated in the junction, an output voltage signal $V_1$ is produced which is indicative of the temperature difference between the junction and the temperature sensor.

Temperature sensor 27 comprises a positive temperature coefficient thermistor whose resistance is directly proportional to its temperature. Constant current source 39 provides a current $I_c$ of constant magnitude through thermistor 32 of the sensor to insure accuracy. The voltage across the thermistor is utilized to provide output signal $V_2$ which is indicative of the temperature of the thermistor and thus the portion of the heat sink to which it is attached. Current level $I_c$ is chosen low enough so that the internal heat generated by its passage through the thermistor is insignificant.

An adjustable amplifier 40 is utilized to amplify voltage $V_2$ to provide an output voltage $V_3$ which is scaled consistently with output voltage $V_1$ of the simulator 38 (i.e., each volt of $V_3$ represents the same degree of temperature as each volt of $V_1$). Scaled output $V_3$ and output $V_1$ serve as inputs into adder 41 where they are algebraically combined to form output signal $V_4$.

Since voltage $V_1$ represents the temperature difference between the junction and the heat sink reference point and voltage $V_2$ represents the temperature of the heat sink reference point, the combined signal $V_4$ represents the temperature of the rectifying junction per se.

Voltage $V_4$ is provided as an input to a level detector 42. When voltage $V_4$ is above a certain point (indicating that the junction temperature is dangerously elevated), level detector 42 provides a stop signal S which is preferably provided to control 7 to suppress the gate signals therefrom. This signal can also be utilized to provide an audible or visible alarm to indicate the elevated junction temperature.

While our temperature monitor is shown and described in connection with a three-phase AC static circuit breaker, it should be apparent that our monitor is capable of use with various solid state power apparatus such as rectifiers, inverters and frequency changers. Accordingly, it will be obvious to those skilled in the art that various changes and modifications may be made without departing from our invention in its broader aspects and we, therefore, intend herein to cover all such changes and modifications as fall within the true scope of our invention.

What our claim and desire to secure by Letters Patent of the United States is:

1. In a power circuit including a semiconductor device having a pair of main current conducting electrodes and a body of semiconductor material having at least one PN-junction therein, said device having at least one of its electrodes mechanically coupled to a heat sink to form a unitary assembly therewith, an improved circuit for monitoring the junction temperature of said semiconductor device comprising:

a. temperature sensing means adapter for providing a first signal which is indicative of the temperature of a selected portion of said assembly;

b. means for detecting the amount of current flowing through said junction and for providing a second signal which is indicative thereof;

c. a nonlinear function generator adapted for translating said second signal into a third signal which is indicative of the power dissipation characteristics of said semiconductor device;

d. means for frequency attenuating said third signal and for providing a fourth signal which is indicative of the temperature difference between said junction and said selected portion of said assembly; and e. means for algebraically combining said first signal and said fourth signal to thereby provide an output signal which is indicative of the actual junction temperature.

2. The temperature monitoring circuit as specified in claim 1 wherein the selected portion of said assembly is a portion of the heat sink closely adjacent said junction.

3. The temperature monitoring circuit as specified in claim 1 additionally comprising:

f. a level detector coupled to the output of said combining means for providing a fifth signal whenever said output signal reaches a preselected level.

4. The temperature monitoring circuit as specified in claim 2 additionally comprising:

f. a level detector coupled to the output of said combining means for providing a fifth signal whenever said output signal reaches a preselected level.

5. The temperature monitoring circuit as specified in claim 3 wherein said semiconductor devices is a thyristor having a gate electrode to which trigger signals are supplied by a control circuit and wherein said control circuit is disabled from providing said trigger signals in response to the occurrence of said fifth signal.

6. In a power circuit including solid state switch comprising a plurality of similar parallelly connected semiconductor devices each having a pair of main current conducting electrodes and a body of semiconductor material having at least one PN-junction therein, each of said devices having at least one of its electrodes mechanically coupled to a heat sink to form a unitary assembly therewith; an improved circuit for monitoring the junction temperature of a selected semiconductor device comprising:

a. temperature sensing means adapted for providing a first signal which is indicative of the temperature of a selected portion of the assembly of a device which normally gets the hottest, said temperature sensing means being connected to the heat sink closely adjacent the junction of said device, b. means for detecting the amount of current flowing through said junction and for providing a second signal which is indicative thereof;

c. a nonlinear function generator adapted for translating said second signal into a third signal which is indicative of the power dissipation characteristics of said semiconductor device;

d. means for frequency attenuating said third signal and for providing a fourth signal which is indicative of the temperature difference between said junction and said selected heat sink portion; and e. means for algebraically combining said first signal and said fourth signal which is indicative of the actual junction temperature.

7. The temperature monitoring circuit as specified in claim 6 additionally comprising a level detector coupled to the output of said combining means for providing a fifth signal whenever said output signal reaches a preselected level.

8. In a power circuit including a semiconductor device having a pair of main current conducting electrodes and a body of semiconductor material having at least one PN-junction therein, said device having at least one of its electrodes mechanically coupled to a heat sink to form a unitary assembly therewith, a method of monitoring the junction temperature of said device comprising the steps of:

a. sensing the temperature of a selected portion of said assembly and providing a first signal which is indicative thereof;

b. detecting the amount of current flowing through the junction and providing a second signal which is indicative thereof;

c. translating said second signal into a third signal which is indicative of the power dissipated in said junction;

d. frequency attenuating said third signal to provide a fourth signal which is indicative of the temperature difference between said junction and said selected portion of said assembly; and e. algebraically combining said first signal and said fourth signal to provide an output signal which is indicative of junction temperature.

9. The method as specified in claim 8 wherein said selected portion of the assembly is a portion of the heat sink closely adjacent the junction.

10. The method as specified in claim 9 additionally comprising the step of monitoring the magnitude of said output signal to provide a fifth signal when said output signal reaches a preselected magnitude.

* * * * *